US012160535B2

(12) United States Patent
Yoon

(10) Patent No.: US 12,160,535 B2
(45) Date of Patent: *Dec. 3, 2024

(54) FOLDING CASE WITH ROTATING SIDE COVER

(71) Applicant: SPIGEN KOREA CO., LTD., Seoul (KR)

(72) Inventor: Tae Sung Yoon, Seoul (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,379

(22) Filed: Nov. 14, 2023

(65) Prior Publication Data
US 2024/0089355 A1 Mar. 14, 2024

Related U.S. Application Data

(63) Continuation of application No. 17/449,451, filed on Sep. 29, 2021, now Pat. No. 11,889,005.

(60) Provisional application No. 63/198,091, filed on Sep. 29, 2020.

(30) Foreign Application Priority Data

Oct. 29, 2020 (KR) .......................... 10-2020-0142315

(51) Int. Cl.
H04M 1/02 (2006.01)
(52) U.S. Cl.
CPC ................................. H04M 1/021 (2013.01)

(58) Field of Classification Search
CPC ...... G06V 40/20; G06V 10/764; G06V 10/82; G06V 20/52; G06N 20/00; G16H 40/63; G06F 18/24143; H04M 1/0206
See application file for complete search history.

(56) References Cited

U.S. PATENT DOCUMENTS

| 5,467,504 | A  | * | 11/1995 | Yang ..................... | E05D 11/084 |
| | | | | | 16/342 |
| 7,513,010 | B2 | * | 4/2009 | Duan ................... | E05D 11/1028 |
| | | | | | 16/303 |
| 9,204,565 | B1 | * | 12/2015 | Lee ............................ | E05D 7/00 |
| 9,523,226 | B1 | * | 12/2016 | Lam ....................... | G06F 1/1618 |

(Continued)

FOREIGN PATENT DOCUMENTS

KR 10-2015-0062882 A 6/2015
KR 10-2016-0124318 A 10/2016
(Continued)

Primary Examiner — Lewis G West
(74) Attorney, Agent, or Firm — Bridgeway IP Law Group, PLLC; Jihun Kim

(57) ABSTRACT

A protective case for foldable mobile devices is described. The folding case comprises a first case and a second case, wherein the folding case further comprises a side cover which rotates by an elastic part as the foldable mobile device is folded or unfolded, and provides a full protection for the entire foldable mobile device including each corner of its hinge part. The folding case according to the present invention covers the hinge part smoothly without any unfavorable space or gap, and it provides the satisfaction with the use and the beauty of the overall appearance as the users would conceive that the two separated case parts and the hinge part operates as if those parts form one united case.

8 Claims, 16 Drawing Sheets

(56) References Cited

U.S. PATENT DOCUMENTS

| | | | |
|---|---|---|---|
| 11,223,710 B2 * | 1/2022 | Cheng | H04M 1/0268 |
| D1,011,333 S * | 1/2024 | Weng | D14/250 |
| D1,016,052 S * | 2/2024 | Liang | D14/250 |
| 2005/0195322 A1 * | 9/2005 | Park | H04M 1/0247 |
| | | | 348/E5.025 |
| 2006/0032020 A1 * | 2/2006 | Duan | G06F 1/1681 |
| | | | 16/288 |
| 2006/0112517 A1 * | 6/2006 | Luo | H04M 1/0216 |
| | | | 16/330 |
| 2006/0238968 A1 * | 10/2006 | Maatta | H04N 1/00525 |
| | | | 361/679.01 |
| 2006/0254026 A1 * | 11/2006 | Duan | E05D 11/1028 |
| | | | 16/330 |
| 2007/0028736 A1 * | 2/2007 | Oh | B67B 7/92 |
| | | | 83/100 |
| 2007/0076861 A1 * | 4/2007 | Ju | H04M 1/0247 |
| | | | 379/433.01 |
| 2007/0294859 A1 * | 12/2007 | Hsu | H04M 1/0216 |
| | | | 16/330 |
| 2009/0273890 A1 * | 11/2009 | Takagi | G06F 1/1616 |
| | | | 361/679.01 |
| 2010/0043174 A1 * | 2/2010 | Bestle | G06F 1/1679 |
| | | | 16/388 |
| 2010/0275413 A1 * | 11/2010 | Kim | H04M 1/0216 |
| | | | 16/303 |
| 2012/0224305 A1 * | 9/2012 | Yoo | G06F 1/1632 |
| | | | 248/176.1 |
| 2013/0083496 A1 * | 4/2013 | Franklin | H10K 59/40 |
| | | | 361/752 |
| 2014/0042293 A1 * | 2/2014 | Mok | G06F 1/1681 |
| | | | 248/682 |
| 2014/0085795 A1 * | 3/2014 | Xia | G06F 1/1618 |
| | | | 361/679.01 |
| 2014/0293519 A1 * | 10/2014 | Wang | G06F 1/1681 |
| | | | 361/679.01 |
| 2015/0233162 A1 * | 8/2015 | Lee | H04M 1/022 |
| | | | 16/223 |
| 2018/0062686 A1 * | 3/2018 | Lucente | A45C 13/02 |
| 2018/0139857 A1 * | 5/2018 | Cavenagh | G06F 1/1686 |
| 2018/0152217 A1 * | 5/2018 | Laird | H04B 1/3888 |
| 2019/0166703 A1 * | 5/2019 | Kim | H05K 5/0226 |
| 2020/0229566 A1 | 7/2020 | Mody | |
| 2020/0231235 A1 * | 7/2020 | Yang | B62J 11/00 |
| 2020/0412401 A1 * | 12/2020 | Kim | H04M 1/185 |
| 2021/0026406 A1 * | 1/2021 | Kim | H04M 1/0268 |
| 2021/0044682 A1 * | 2/2021 | Liu | H04M 1/0268 |
| 2022/0311847 A1 * | 9/2022 | Zhao | H04M 1/022 |

FOREIGN PATENT DOCUMENTS

| | | |
|---|---|---|
| KR | 10-2108908 B1 | 5/2020 |
| KR | 10-2020-0086029 A | 7/2020 |

\* cited by examiner

FOLDING CASE WITH ROTATING SIDE COVER

CROSS-REFERENCE TO RELATED APPLICATIONS

This application is a continuation application of the U.S. Utility patent application Ser. No. 17/449,451 filed on Sep. 29, 2021, which claims benefit of U.S. provisional patent application No. 63/198,091, filed on Sep. 29, 2020, which is incorporated herein by reference in its entirety, and additionally claims priority from Korean Patent Application No. 10-2020-0142315, filed on Oct. 29, 2020, which is also incorporated herein by reference in its entirety.

FIELD OF THE INVENTION

The present invention relates to a protective case for electronic devices such as mobile smart phones and cellular phones. Specifically, the present invention relates to such protective cases for foldable mobile electronic devices.

BACKGROUND OF THE INVENTION

A mobile electronic device is a computing device that users are able to carry all the time. Since the users carry a mobile device for their daily life, it is prone to be damaged due to their careless treatments and unintentional drops. Thus, protective cases for mobile electronic devices have been widely used to Minimize the damage. Such protective cases generally protect the mobile electronic device from the outside impact by embracing the exterior of the device with the shell-like structure of the case components.

A typical display system for a mobile electronic device has adopted a flat panel display. However, a flexible display has been recently developed, which enables a screen to be folded or bent, and applied to mobile electronic devices. If the flexible display is applied to the mobile electronic device, the device itself can be folded or bent accordingly. Since the foldable mobile electronic device could provide various innovative applications by its shape transition, there has been a growing expectation in the IT (Information Technology) industry.

However, one of the disadvantages of the foldable mobile device is that it is hard to install a protective case thereon due to the shape transition by the flexible display being folded or bent. In other words, the case may be easy to be installed on the non-transitionable portion of the foldable mobile device, whereas the case may be difficult to be installed on the transitionable portion due to its shape transition.

Since the cases currently available are difficult to be placed on the foldable mobile device, especially on its hinge part which enables the foldable mobile device to be folded or bent, it is hard to provide a full protection to the device from outside impact. In particular, since the hinge part is one of the most fragile components of the foldable mobile device, a case that protects the hinge part and the overall device regardless of the shape transitions is required to provide users with the full protection of the foldable mobile device.

There is a case system commercially available that is designed to protect a foldable mobile device, including the hinge part, by connecting two separated case parts with an elastic linear protective component. However, the elastic linear protective component between two case parts does not fit tightly to the hinge part depending on the position of the flexible display of the foldable mobile device, if it does not fit tightly, the full protection of the foldable mobile device, the hinge part thereof in particular, cannot be achieved. Besides, those two case parts are not assembled in a smooth way, and it fails to provide the satisfaction with the use and the beauty of the overall appearance. Furthermore, each corner of the hinge part is not sufficiently covered by the elastic linear component, so that the full protection of the foldable mobile device could not be assured.

SUMMARY OF THE INVENTION

The folding case according to the present invention comprises a first case and a second case, wherein the folding case further comprises a side cover which rotates from a first position to a second position around the rotation axis of the first case, and an elastic part which provides an elastic force for the side cover to return to the first position. The side cover rotates as the foldable mobile device is folded or unfolded.

The present invention provides a full protection for the entire foldable mobile device including each corner of its hinge part. The folding case according to the present invention covers the hinge part smoothly without any unfavorable space or gap, and it provides the satisfaction with the use and the overall aesthetic appearance as the users would conceive that the two separated case parts and the hinge part operates as if those parts form one united case.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

The terms used in the description are to explain the embodiments, but not to limit the present invention in any way. The term 'comprise,' 'comprises,' or 'comprising' is used to describe that a subject matter is constituted from a combination of features or characteristics, Thus, it should be understood that it does not exclude one or more additional features or the combination thereof.

Figure 1:
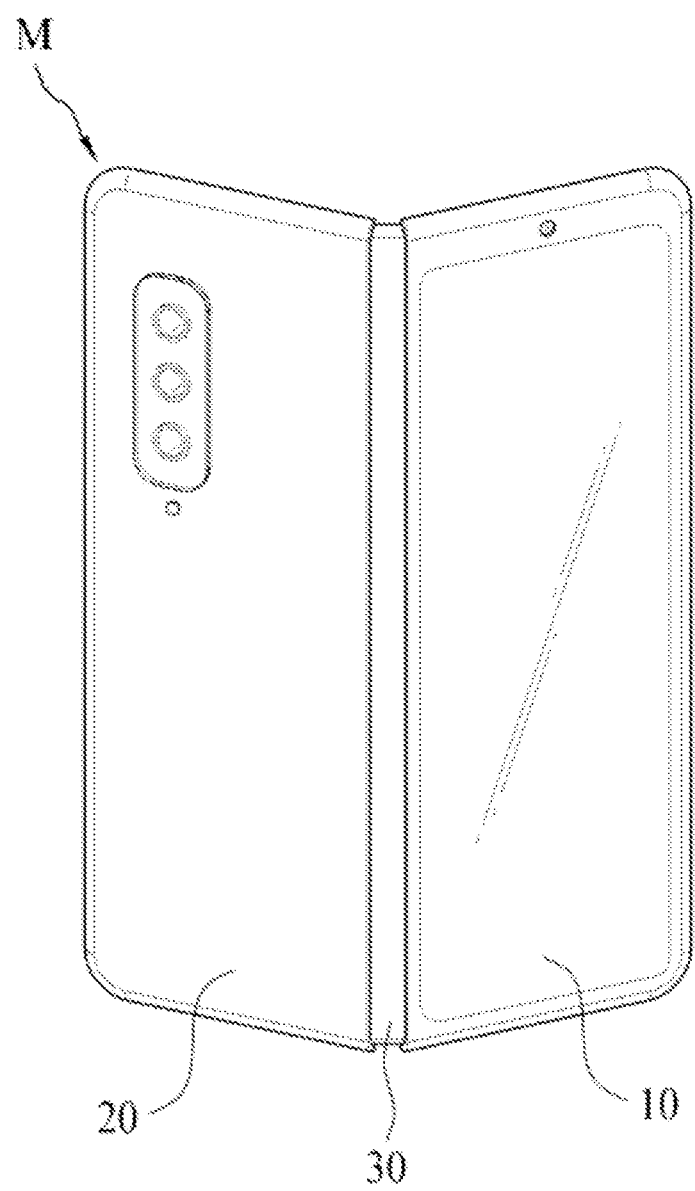
FIG. 1 demonstrates a representative foldable mobile device.

FIG. 1 demonstrates a foldable mobile device (M), According to FIG. 1, the foldable mobile device (M) to which a folding case (C) is applied according to an embodiment of the present invention comprises a first body (10), a second body (20) and a hinge part (30).

Each of the first body (10) and the second body (20) of the foldable mobile device (M) does not change its shape. The hinge part (30) is a feature that allows the foldable mobile device to be folded or bent. However, the hinge part (30) is prone to be damaged by the impact from outside. Therefore, it is important to keep the hinge part (30) safe from the outside impact.

Figure 2:
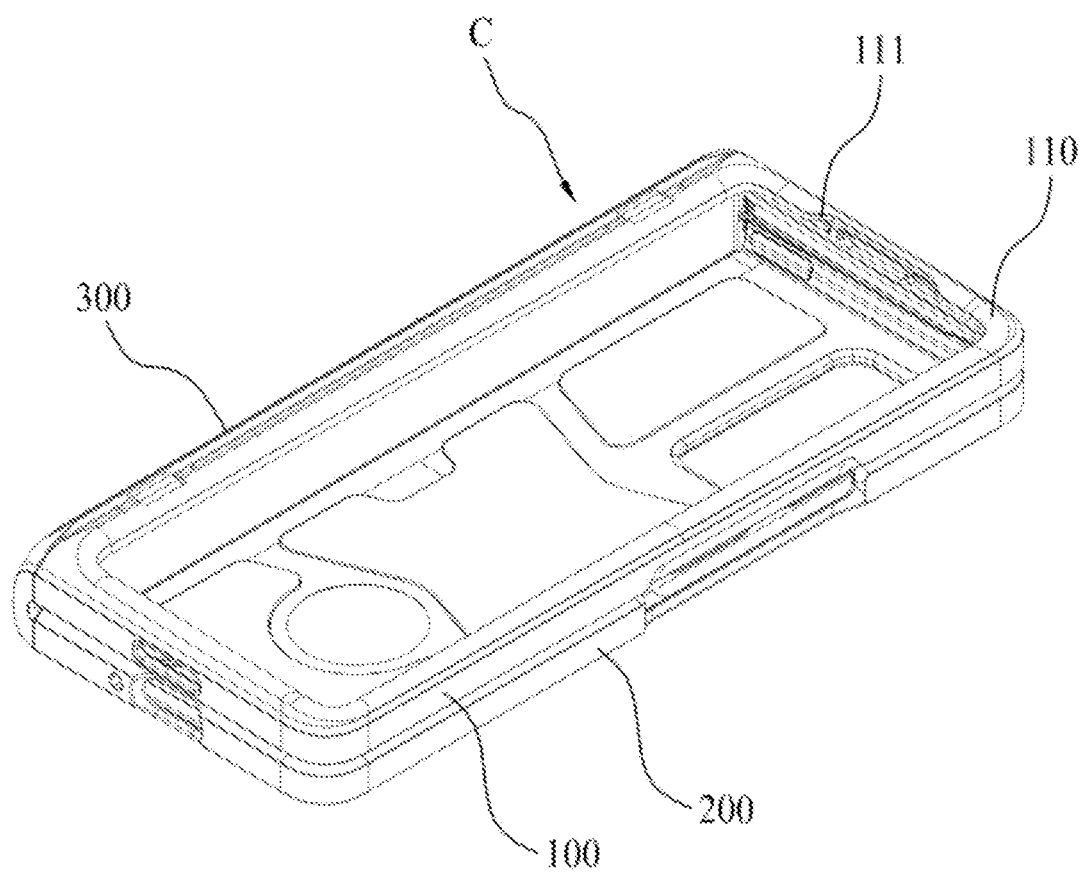
FIG. 2 shows a folding case according to an embodiment of the present invention.
Figure 3:
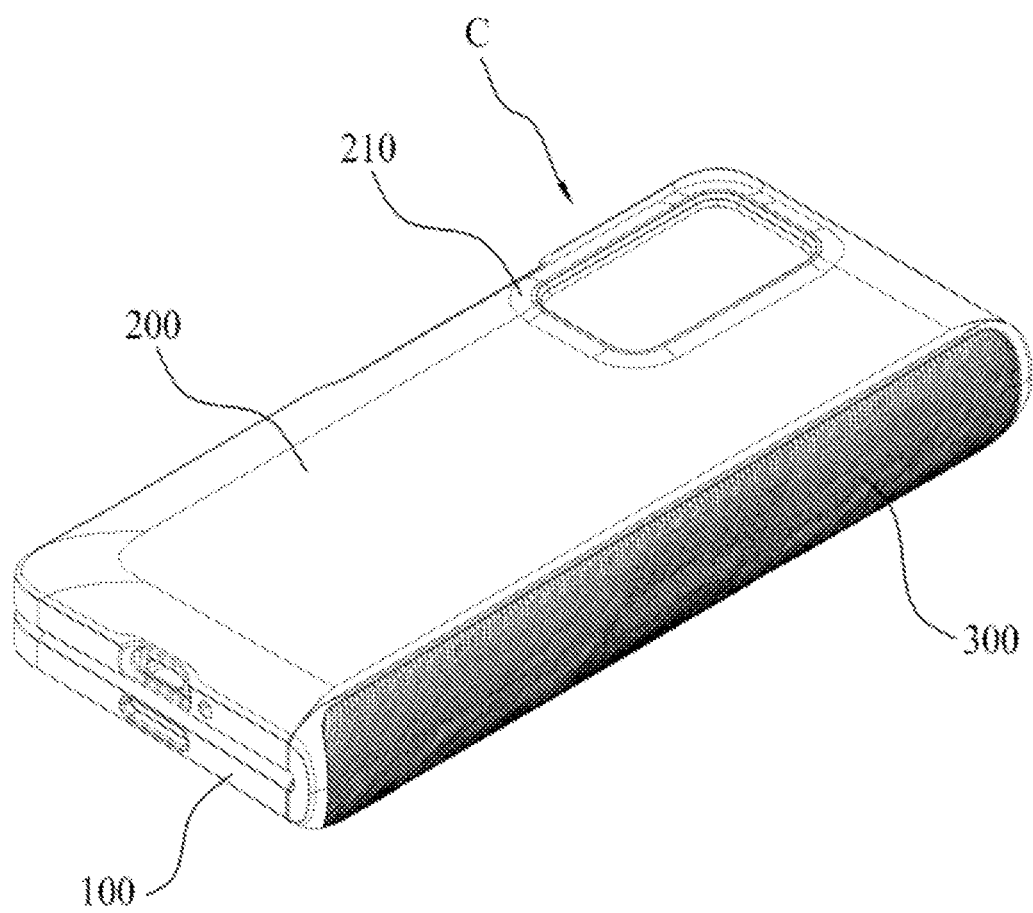
FIG. 3 shows a folding case according to an embodiment of the present invention.

FIGS. 2 and 3 show a folding case (C) according to an embodiment of the present invention. According to FIGS. 2 and 3, the folding case (C) according to an embodiment of the present invention comprises a first case (100), a second case (200), and side cover (300).

The first case (100) is installed on the first body (10) of the foldable mobile device (M). The first case (100) protects the foldable mobile device (M) with its width higher than one surface of the foldable mobile device (M). The first case (100) may comprise an edge part (110) which covers each corner of the first body (10). The edge part (110) protects the first body (10) with its width higher than one surface of the first body (10).

The edge part (110) according to an embodiment comprises a tunnel (111). The tunnel (111) is an aperture that is formed by at least a portion of the edge part (110) being opened or curved. The tunnel (111) is a feature to maintain that at least a portion of a surface of the first case (100) is not covered by the edge part (110). The edge part (110) embraces each corner of the first case (100), and covers a portion of the surface of the first case (100). If a speaker module is located in the portion covered by the edge part (110), the sound from the speaker module may not travel outside. If the tunnel (111) is established on the location of the edge part (110) that corresponds to the speaker module, the sound from the speaker module would travel through the tunnel (111). Accordingly, the sound from the foldable mobile device (M) can travel outwards clearly without being covered by the edge part (110).

The second case (200) is installed on the second body (20) of the foldable mobile device (M). The second case (200) protects the foldable mobile device (M) with its width higher than one surface of the foldable mobile device (M).

The second case (200) comprises a bulge part (210). The bulge part (210) is formed higher than the height of a camera module of the second body (20). If the camera module is located on the second body (20), it may cause scratches on the camera lens due to the height of the protruded camera module even with the protective case. The bulge part (210) is formed higher than the height of the camera module at the location corresponding to the camera module, and keeps the camera module safe from scratches.

The side cover (300) protects the hinge part (30) of a foldable mobile device (M). According to FIG. 3, the side cover comprises a pattern part. The pattern part plays a role in the non-slip function for the side cover (300) which has a round shape pattern for a better grip. In an embodiment of the present invention, the pattern part may have various patterns, including a diagonal pattern, to achieve the non-slip effect, but not limited thereto.

Figure 4:
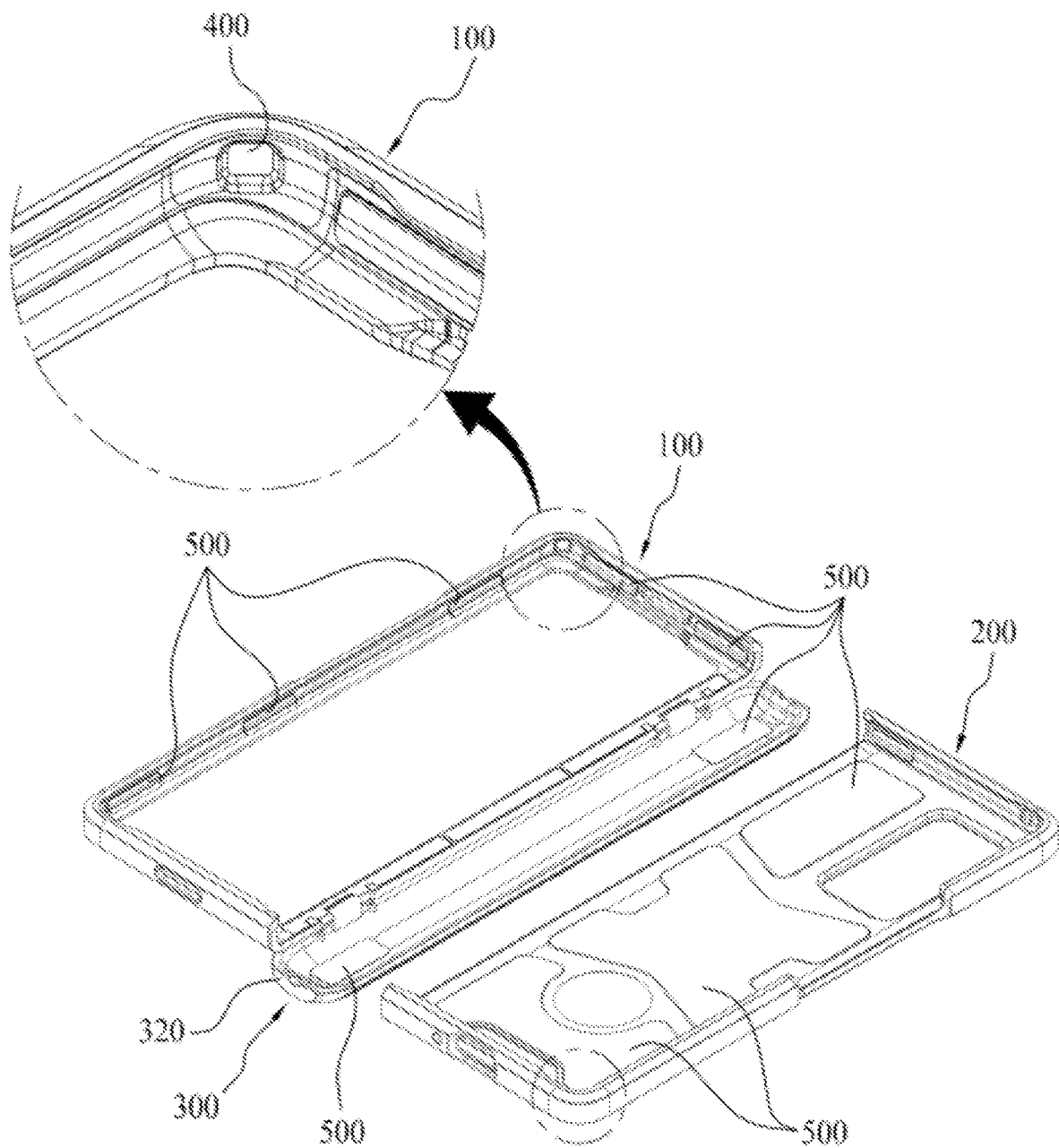
FIG. 4 shows representative features of a folding case according to an embodiment of the present invention.

FIG. 4 shows representative features of a folding case according to an embodiment of the present invention. According to FIG. 4, the side cover (300) is connected to the first case (100). However, the first case (100) and the second case (200) may be separated. The previous folding cases have a connecting part that connects two case parts to protect the hinge part (30) of a foldable mobile device (M). In such cases, two case parts are not connected smoothly due to the unfavorable gap over the connecting part when the folding case is unfolded, and the hinge part (30) cannot be properly protected. However, the present invention provides a case system that the first case (100) and the second case (200) are separated, and the side cover (300) connected to the first case (100) rotates to protect the hinge part (30). Therefore, the structure of the present invention is completely different from the previous folding case that has a connecting part to connect two case parts.

The side cover (300) comprises a cover part (320) that covers up to the corner of the hinge part (30) of the foldable mobile device (M). The connecting part of the previous cases could not protect the corners on the side of the hinge part (30). However, the present invention safely protects the corners on the side of the hinge part (30) by the side cover (300).

The folding case (C) according to an embodiment of the present invention comprises a pad part (500). The pad part (500) touches at least a portion of the foldable mobile device (M). The pad part (500) absorbs the force from the outside that may impact the folding case (C). The pad part (500) may be made of the substance that has a tight adhesive force and elasticity. Thereby, it may protect the foldable mobile device (M) more effectively, and prevent it from minute damages. If the case is directly contacted with the foldable mobile device (M) without the pad part (500), it cannot absorb the impact effectively. Furthermore, the direct contact of the case may cause scratches on the foldable mobile device (M). The pad part (500) according to an embodiment of the present invention absorbs the impact effectively, by allowing the case to maintain a distance from the foldable mobile device (M). Also, the pad part (500) protects the foldable mobile device (M) from the scratches, and at the same time, it improves the tight adhesive force to reduce the gap between the foldable mobile device (M) and the case.

The folding case (C) according to an embodiment of the present invention comprises air rooms (400). The air rooms (400) absorb the impact to the folding case (C) from one side covering the corner of the foldable mobile device (M). The air rooms (400) are formed at the portion that meets the corner of the foldable mobile device (M). The air rooms are formed at the portion that meets the corner of the first body

(10) for the first case (100), and at the portion that meets the corner of the second body (20) for the second case (200). When a case encounters an impact from outside, the empty space of the air rooms (400) minimizes the physical force that would be directly delivered to the foldable mobile device (M). Since the corner portion of the device is prone to damage, the present invention provides a secondary protection to the foldable mobile device (M) by the air rooms (400) in addition to the primary protection by the case.

The folding case (C) according to an embodiment of the present invention may be made of hard material and soft material. By combining the hard and soft material, the folding case (C) may have both properties: a resistance from the impact and a absorbance of the impact. Especially, the frame of the first case (100) and the second case (200) is made of soft material to absorb the impact to the case. Depending on the embodiments, polycarbonate as the hard material and TPU (Thermoplastic Polyurethane) as the soft material, respectively, may be used. However, if the properties are satisfied, the materials for the first case (100) and the second case (200) are not limited to the material above. The double injection moulding may be used to combine the hard material and the soft material.

Figure 5:
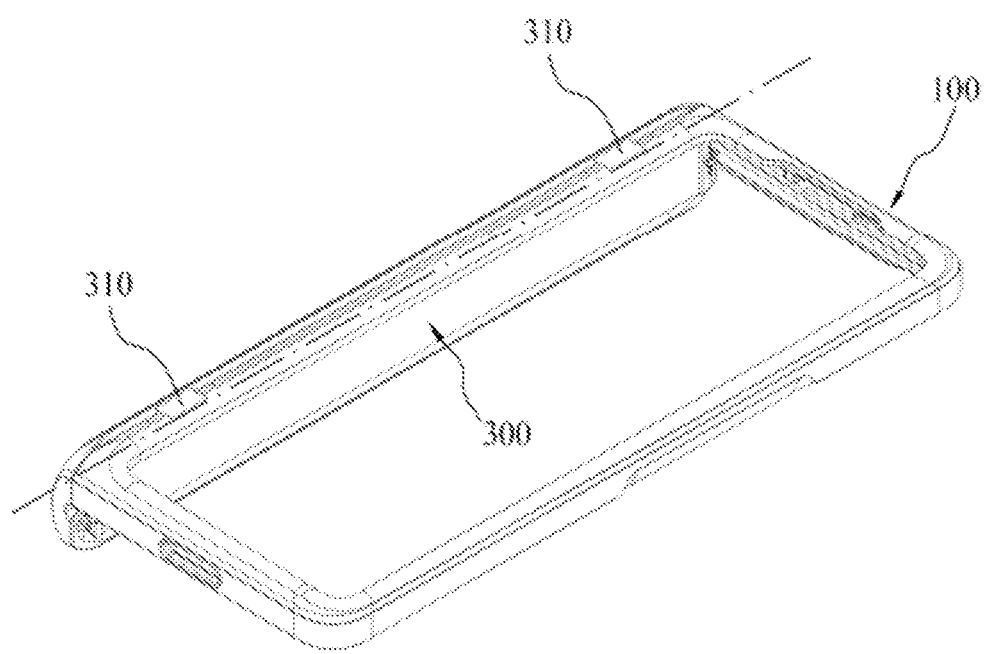
FIG. 5 shows a first case and a side cover of a folding case according to an embodiment of the present invention.
Figure 6:
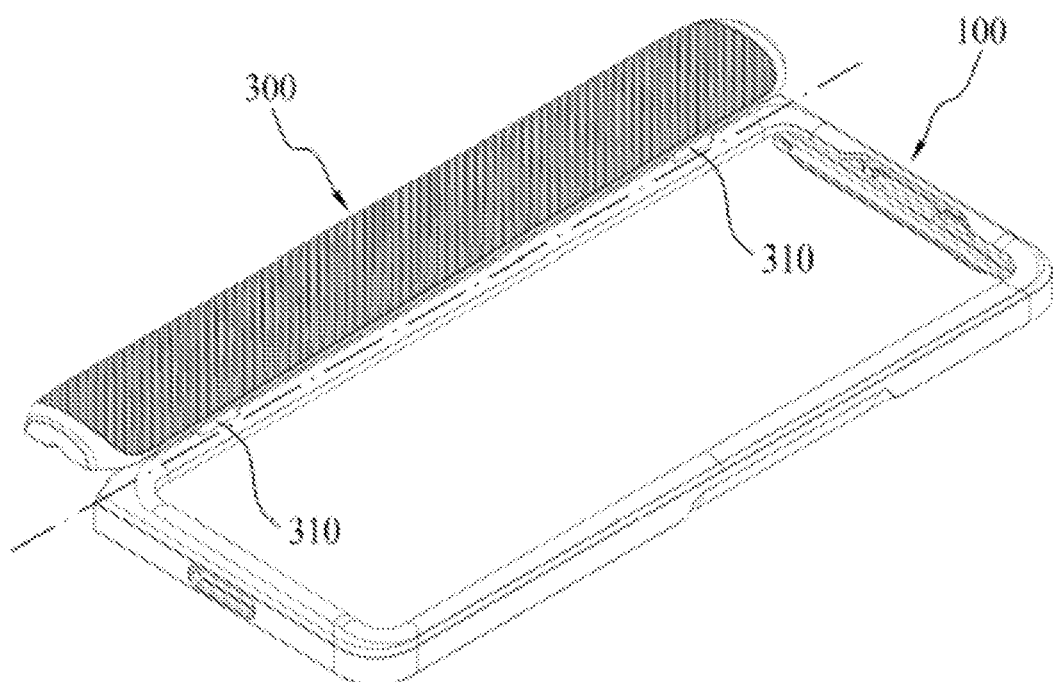
FIG. 6 shows a first case and a side cover of a folding case according to an embodiment of the present invention.

FIGS. 5 and 6 shows the first case (100) and the side cover (300) of a folding case (C) according to an embodiment of the present invention. According to the FIGS. 5 and 6, the side cover (300) rotates along the rotation axis of the first case (100). The side cover (300) rotates from a first position to a second position. FIG. 5 shows the side cover (300) in the first position, and FIG. 6 shows the side cover (300) in the second position after rotation. The first position is the state that the side cover (300) is closed, and the second position is the state that the side cover (300) is open as wide as possible.

Figure 7:
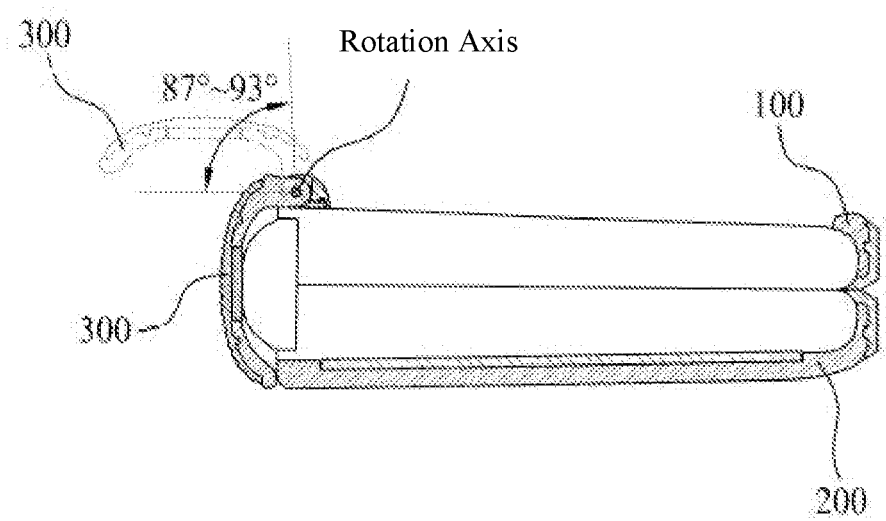
FIG. 7 shows a bottom sectional view of a folding case according to an embodiment of the present invention.

FIG. 7 shows a bottom sectional view of a folding case according to an embodiment of the present invention. The side cover (300) rotates with an angle corresponding to the angle as the foldable mobile device (M) is folded or unfolded. The side cover (300) is able to rotate with an angle the same or wider than the angle that the foldable mobile device (M) rotates. It is because, if the angle that the side cover (300) rotates is smaller than the angle that the foldable mobile device (M) rotates, the side cover (300) may interfere with the folding or unfolding of the foldable mobile device (M). According to FIG. 7, the angle between the first position and the second position may be from 87° to 93°. Preferably, the angle between the first position and the second position may be from 88.3° to 90°. It is derived by the repetitive simulation, and it corresponds to the optimal angle that the side cover (300) could respond to the angle that the foldable mobile device is folded or unfolded. Depending on the embodiments, the angle between the first position and the second position could be established depending on the rotatable angle of the foldable mobile device.

Figure 8:
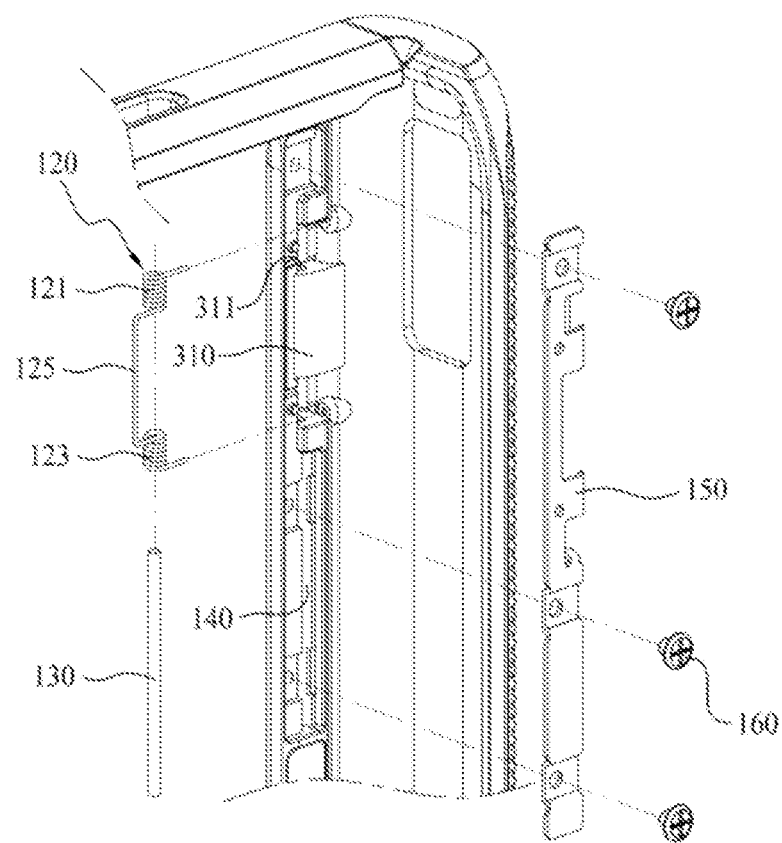
FIG. 8 demonstrates a detailed connecting structure between a first case and a side cover of a folding case according to an embodiment of the present invention.

FIG. 8 demonstrates a detailed connecting structure between a first case (100) and a side cover (300) of a folding case (C) according to an embodiment of the present invention. According to FIG. 8 the folding case (C) according to an embodiment of the present invention comprises an elastic part (120). The first case also comprises a support (150). The elastic part (120) provides an elastic force that enables the side cover (300) to return to the first position. The elastic part (120 is located at one side of the first case (100), and connected to the side cover (300). The elastic part (120) enables the side cover (300) to rotate along with the rotation axis of the first case (100), and to return back to the first position. The support (150) fixes or supports at least a portion of the elastic part (120). More specifically, while at least a portion of the elastic part (120) is supported by the support (150), the elastic force that enables the side cover (300) to rotate back to the first position along with the rotation axis of the first case (100) is delivered to the side cover (300) that is connected to the elastic part (120).

Meanwhile, the support (150) functions that the first case (100) is not to be pushed back or distorted. If the edge part (110) of the first case (100) is thin enough not to interfere with the display module of the foldable mobile device (M), it is easy to be pushed back or distorted by the force applied to the fold case. However, since the support (150) fixes or supports one side of the edge part (110), the first case (100) is more stably installed on the first body (10), and protects the foldable mobile device (M). Preferably, the support (150) is made of steel. However, it is not limited to the aforementioned material, but various materials that satisfy the requirements for the strength to support the elastic part (120) and the first case (100) could be used.

Hereinafter, an embodiment that includes a spring in the elastic part (120) is described. The feature in the elastic part (120) is not limited to the spring, but various components that provide an elastic force could also be considered.

The elastic part (120) comprises a pair of torsion springs separated apart while being connected by an arm. The pair of torsion springs comprises a first torsion spring (121) and a second torsion spring (123). The first torsion spring (121) and the second torsion spring (123) are positioned in parallel. That is, a pair of torsion springs separated apart in parallel, while being connected by an arm. The pair of torsion springs are connected to each other with a first arm, while a second arm is connected to the side cover (300).

The elastic part (120) comprises a ring part (125). The ring part (125) is formed by a pair of torsion springs that are connected to each other by an arm. In an embodiment of FIG. 8, the first arm of a pair of torsion springs are connected to each other to form the ring part (125). Although the ring part (125) in FIG. 8 is linear, the ring part (125) may include any shape of the arm that connects a pair of torsion springs separated apart.

The side cover (300) comprises a protrusion (310) which has a pin hole (311). A pin (130) is inserted inside the pin hole (311), which enables the side cover (300) to rotate along with the rotation axis of the first case (100). The pin (130) is inserted into the pin hole (311) located at the rotation axis of the first case (100), and functions as a shaft for the rotation axis of the side cover (300). The first case (100) comprises a pin groove (140), which is connected to a coil of the elastic part (120). The pin (130) is inserted inside the coil from the pin groove (140).

Figure 9:
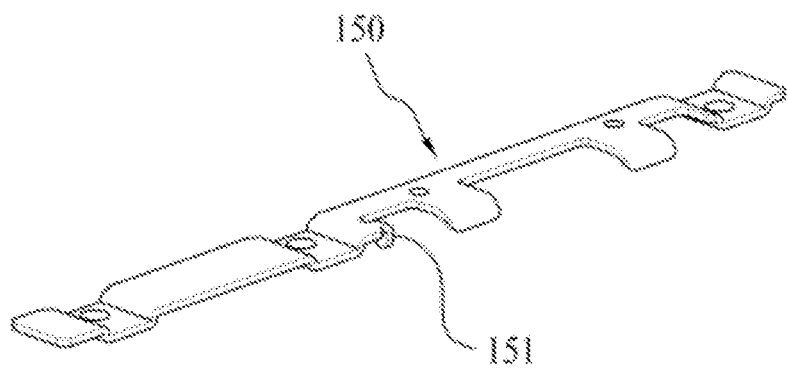
FIG. 9 shows a support of a folding case according to an embodiment of the present invention.

FIG. 9 shows a support of a folding case according to an embodiment of the present invention. According to the FIG. 9, the support (150) comprises a closure (151). The closure (151) covers one side of the pin groove (140). Thus, the closure (151) functions to prohibit the pin (130) falling off the pin hole (311) and the coil. The pin (130) is inserted inside the coil and the pin hole (311), while being covered by the closure (151), and functions as a shaft for the rotation axis of the side cover (300). Thus, the side cover (300) may rotate by the hinge linkage to the first case (100).

Figure 10:
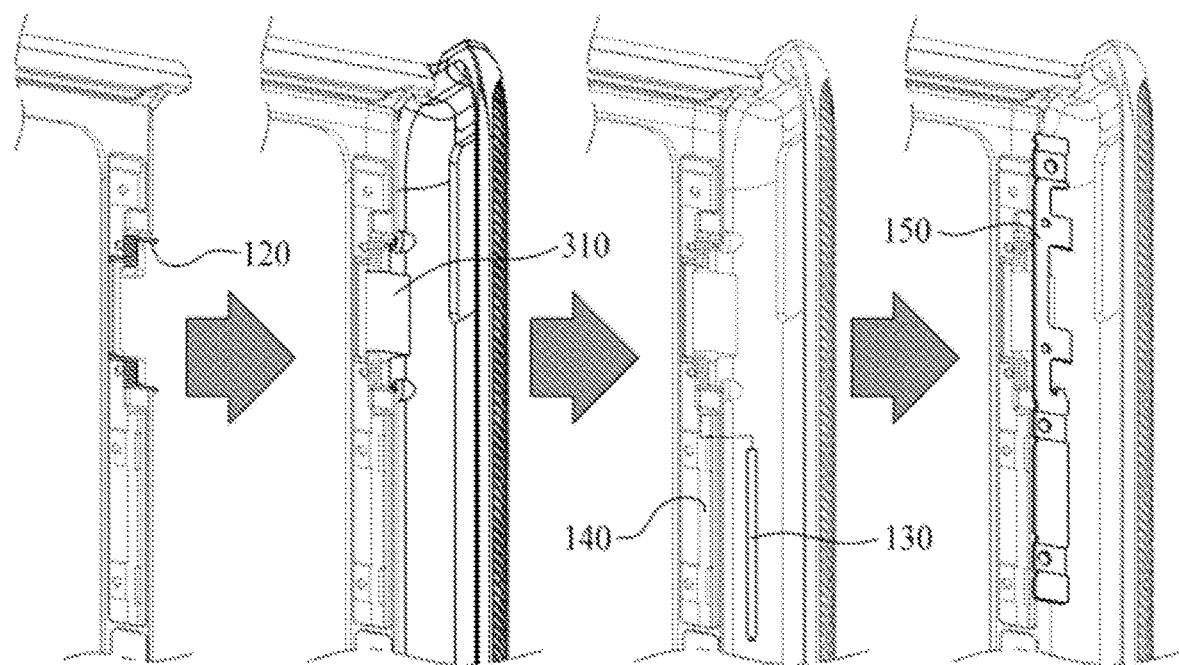
FIG. 10 demonstrates steps of connection between a first case and a side cover of a folding case according to an embodiment of the present invention.

FIG. 10 demonstrates steps of connection between a first case (100 and a side cover (300) of a folding case (C) according to an embodiment of the present invention. According to FIG. 10, the elastic part (120) is first located at one side of the first case (100). Next, the protrusion (310)

of the side cover (300) is placed at the elastic part (120), in between the pair of torsion springs. Then, the pin (130) is inserted inside the coil of the elastic part (120) and the pin hole (311) of the protrusion (310) from the pin groove (140). When the support (150) is engaged on to the elastic part (120), the pin (130) inside does not fall off from the position by the closure (151). The support (150) could be placed on the first case (100) by the linkage part (160). In an embodiment, the linkage part (160) links the support (150) to the first case (100) with a screw linkage. However, the linkage part (160) may also link the support (150) to the first case (100) in various ways other than the screw linkage.

Figure 11:
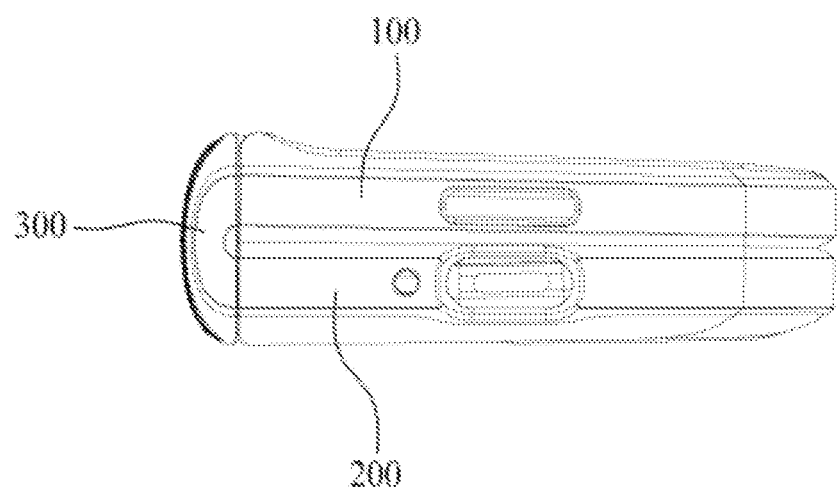
FIG. 11 shows a folding case in a closed state according to an embodiment of the present invention.
Figure 12:
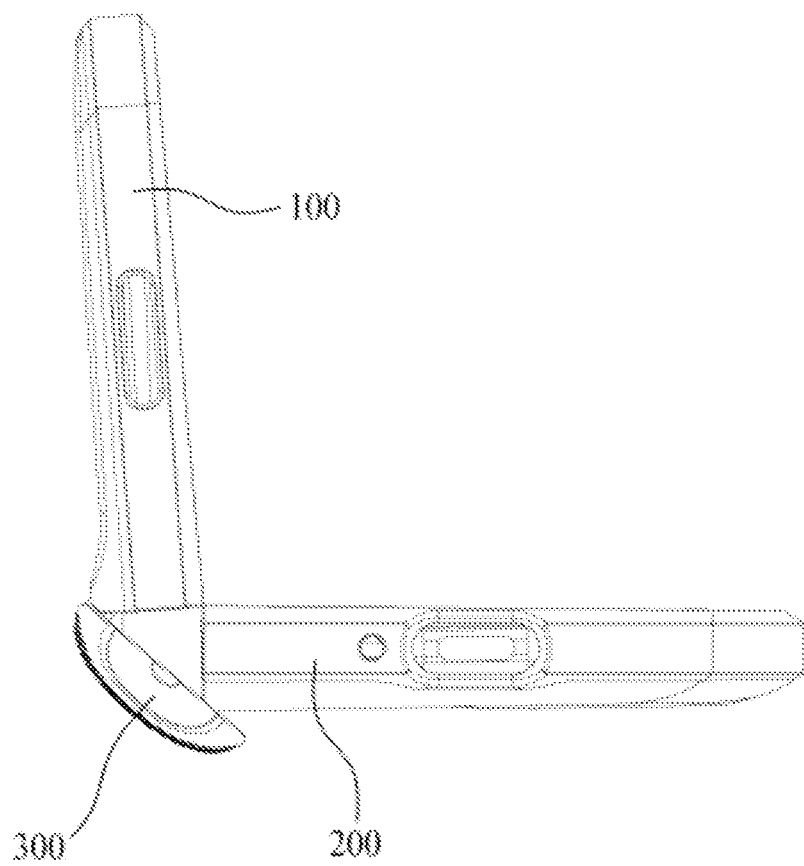
FIG. 12 shows a folding case in an open state according to an embodiment of the present invention.
Figure 13:
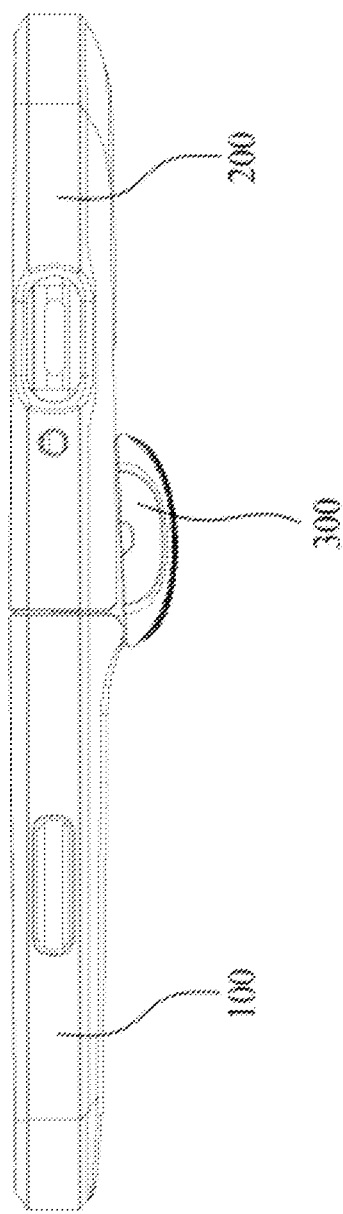
FIG. 13 shows a folding case in an open state according to an embodiment of the present invention.

FIG. 11 shows a folding case (C) in a closed state according to an embodiment of the present invention. FIGS. 12 and 13 show a folding case (C) in an open state according to an embodiment of the present invention. The side cover (300) rotates back to the first position by the elastic part (120). As demonstrated in FIG. 11, the side cover (300) maintains the first position by the elastic force of the elastic part (120) when the folding case (C) is in a closed state by the foldable mobile device being folded. As in FIGS. 12 and 13, when the folding case (C) is in a open state by the foldable mobile device (M) unfolded, the side cover (300) tends to rotate back to the first position by the elastic force generated by the elastic part (120) twisted while the side cover (300) is supported by the support (150). According to FIGS. 12 and 13, the side cover (300) rotates with contacting tightly one side of the second case (200) by the elastic force of the elastic part (120). As a result, the side cover (300) protects the hinge part (30), while rotating, by contacting tightly the second case (200) when the foldable mobile device (M) becomes folded or unfolded.

The degree of contact between the side cover (300) and the second case (200) is adjustable by the arm angle of the torsion spring in the elastic part (120). It is because the elastic force is dependent on the arm angle of the torsion spring. If the elastic force is too strong, it makes it hard to open the fold case (C) since it is difficult to open the side cover (300). On the other hand, if the elastic force is too weak, the hinge part (30) of the foldable mobile device (M) could be exposed or there would be a space between the side cover (300) and the second case (200) since the side cover (300) could not tightly contact to the second case (200). Thus, it is important to maintain the optimal elastic force that enables the side cover (300) to contact the second case while rotating. In an embodiment of the present invention, the arm angle of the torsion springs is 180°, but it can be modified depending on the elastic force.

Figure 14:
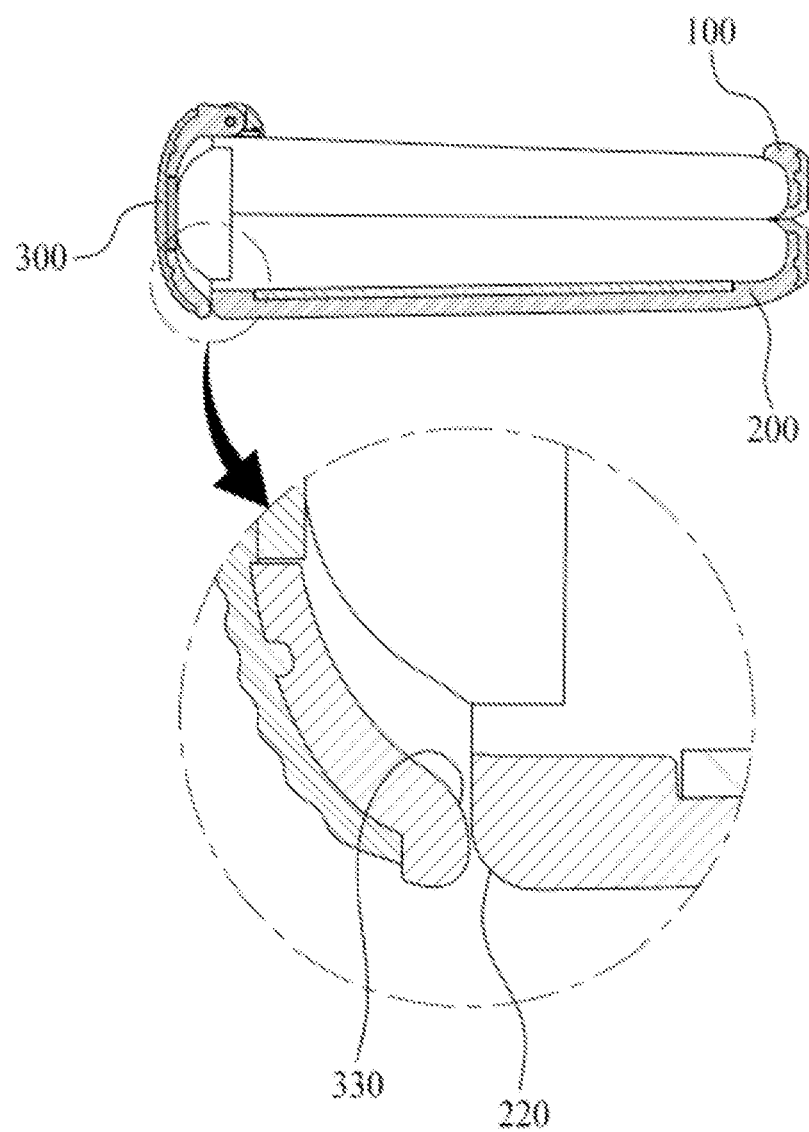
FIG. 14 shows a bottom sectional view of a folding case according to an embodiment of the present invention.

FIG. 14 shows a bottom sectional view of a folding case (C) according to an embodiment of the present invention. Each of the side cover (300) and the second case (200) comprises a curve (330, 220). The curve (330) of the side cover (300) is formed in a round shape at one corner that contacts the second case (200). Similarly, the curve (220) of the second case (200) is formed in a round shape at one corner that contacts the side cover (300). If the curves (330, 220) are not implemented at the portion where the side cover (300) and the second case (200) contact each other, the side cover (300) is not able to rotate over the second case (200) smoothly. As in FIG. 14, since the curves (330, 220) are implemented at the portion where the side cover (300) and the second case (200) contact each other, the portion where they contact is not plane-to-plane, but point-to-point, which makes the side cover (300) rotate over the second case (200) easier. In an embodiment, the R value of the curve (330) of the side cover (300) is larger than the R value of the curve (220) of the second case (200). The R value is a radius or rounding value, and it defines how much the corner is rounded. If the R value of the curve (330) of the side cover (300) is larger, the side cover (300) is able to rotate over the curve (220) of the second case (200) easier. Thus, when the foldable mobile device (M) is unfolded, it may provide the users with convenience that comes from smooth rotation of the side cover (300) over the second case (200).

In an embodiment, the R value of the curve (330) of the side cover (300) may be from 1 mm to 3 mm, and the R value of the curve (220) of the second case (200) may be from 0.5 mm to 2.5 mm. However, each R value could have a different value with the condition that the R value of the curve (330) of the side cover (300) is larger than the R value of the curve (220) of the second case (200).

Figure 15:
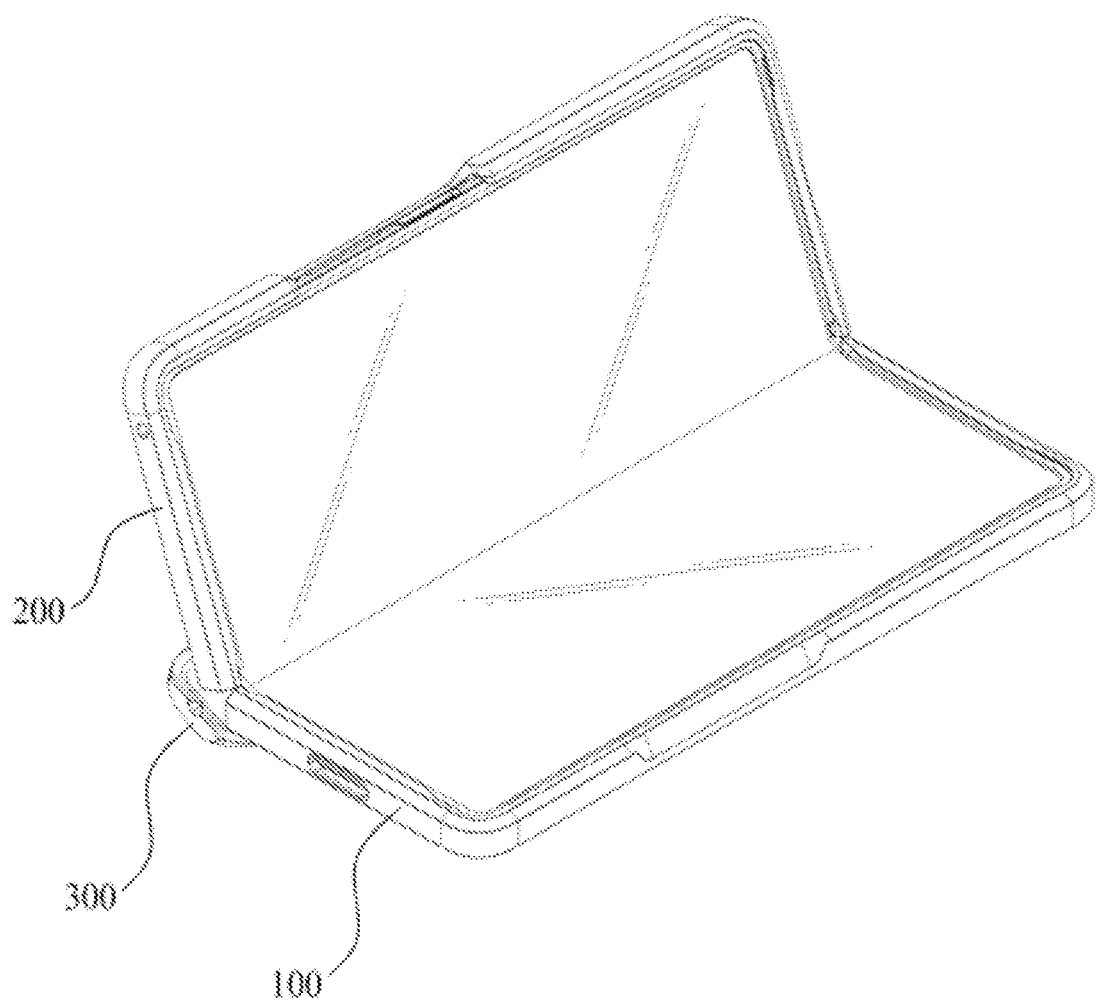
FIG. 15 demonstrates that a side cover of a folding, case is used as a stand according to an embodiment of the present invention.

FIG. 15 demonstrates that a side cover (300) of a folding case (C) is used as a stand according to an embodiment of the present invention. According to FIG. 15, the side cover (300) may function as a stand. Depending on the position of the hinge part (30), the foldable mobile device (M) could be fixed in a position that it is folded or unfolded in a certain degree of angle. The side cover (300) rotates while the foldable mobile device (M) is unfolded, where it generates a height difference from the surface of the first case (100). Due to such height difference, the foldable mobile device (M) may be in a higher position with the fold case (C), compared to without the fold case. Thus, the side cover (300) may provide various angles of the stand depending on the degree of folding or unfolding of the foldable mobile device (M).

Figure 16:
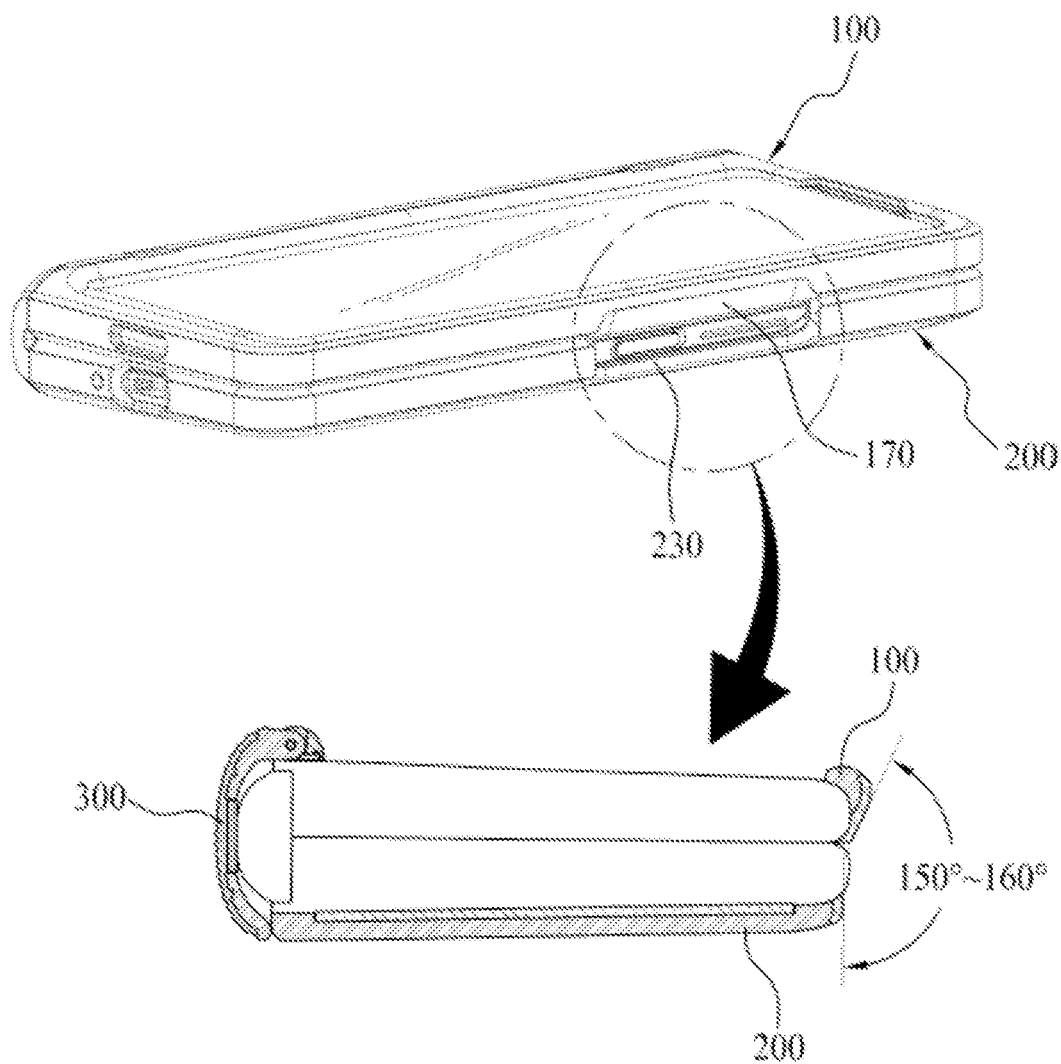
FIG. 16 shows a button part of a folding case according to an embodiment of the present invention.

FIG. 16 shows a button part of a folding case (C) according to an embodiment of the present invention. According to FIG. 16, the first case (100) comprises a first button part (170), and the second case (200) comprises a second button part (230). The button part may have a groove or an opening at one side of the first case (100) and the second case (200), in order to press the button of the foldable mobile device (M) easily. In an embodiment of FIG. 16, the first case (100) has a groove on one side, while the second case (200) has an opening on the corresponding side. However, the button part may have various combinations of the groove and the opening, not limited to the above, depending on the exterior design or the arrangement of the buttons of the foldable mobile device (M).

When the foldable mobile device (M) is in a folded state, the angle between each side of the first button part (170) and the second button part (230) has a certain degree of angle. Depending on the embodiments, a foldable mobile device (M) may comprise a module or a button for verification that requires a direct contact with a body part of a user. If such a module or a button for verification is included, at least a portion of the button part should be open to allow the direct contact. However, on the other hand, as the display of a foldable mobile device (M) gets larger, it becomes more difficult to implement the feature of an opening as the edge part (110) gets thinner so as not to interfere with the display. It is because, if the area of the opening on the edge part (110) becomes larger, it gets harder to maintain the durability of a case. In order to maintain the durability of a case, one of the first button part (170) and the second button part (230) is open, and the other is formed as a groove. However, if only one of the first button part (170) and the second button part (230) has an opening, it is not easy to press the button. The present invention forms a certain degree of angle on one side of the button part of the first case (100) and the second case (200) to facilitate the direct contact to the module or button for verification of the foldable mobile device (M). By the formation of the designated degree of angle, it spontaneously leads the body part to the button part. Therefore, the present invention may allow users to press the button more easily due to the angle of the button part, while maintaining the durability of the folding case (C).

When the foldable mobile device (M) is in a folded state, the angle between each side of the first button part (170) and the second button part (230) may be from 150° to 160°, and preferably, 155°. It is derived by the repetitive simulation, and it corresponds to the angle that provides the convenience for a user to easily contact the module or the button for verification.

The present invention, different from the previous folding cases, provides the full protection up to the corner of the hinge part (30), and at the same time, the portion that protects the hinge part (30) while the folding case (C) is folded or unfolded without any unfavorable space or gap. Therefore, the present invention provides a full cover case that protects the entire foldable mobile device (M). In particular, the side cover (300) of the present invention rotates with contacting tightly the second case (200 while the folding case (C) is folded or unfolded, and thereby, it provides the impression as if the first case (100) and the second case (200) form one united case. Also, the folding case (C) according to the embodiments of the present invention provides the overall aesthetic appearance as the users would have the impression as if those parts form one united case by the side cover (300) while the first case (100) and the second case (200) are separated.

The description of the present invention as above is an exemplary disclosure, and a skilled person in the art may be able to carry out the present invention with an obvious modification in various ways. Therefore, the scope of protection of the present invention is not limited to the description and expression of embodiments. While the invention has been shown and described with reference to different embodiments thereof, it will be appreciated by those skilled in the art that variations in form, detail, compositions and operation may be made without departing from the spirit and scope of the invention as defined by the accompanying claims.

The numbers and symbols used in the description and in the figures for the present invention are summarized below:

C: a folding case;
10: a first body;
20: a second body;
30: a hinge part;
100: a first case;
110: an edge part;
111: a tunnel;
120: an elastic part;
121: a first torsion spring;
123: a second torsion spring;
125: a ring part;
130: a pin;
140: a pin groove;
150: a support;
151: a closure;
160: a linkage part;
170: a first button part;
200: a second case;
210: a bulge part;
220: a curve;
230: a second button part;
300: a side cover;
310: a protrusion;
311: a pin hole;
320: a cover part;
330: a curve;
400: air rooms; and
500: a pad part.

What is claimed is:

1. A case assembly for a foldable mobile electronic device, the case assembly comprising:
a first case;
a second case; and
a side cover connected to the first case and configured to rotate from a first position to a second position around a rotation axis of the first case,
wherein the side cover is configured to rotate as the foldable mobile electronic device is folded or unfolded,
wherein the side cover is separated from the second case and is configured to contact the second case when the foldable mobile electronic device is folded or unfolded,
wherein the case assembly further comprises an elastic part configured to provide an elastic force to the side cover,
wherein the elastic part includes a spring having a coil,
wherein the side cover has a protrusion having a pin hole aligned along the rotation axis of the first case, and
wherein a pin is inserted inside the pin hole and the coil of the spring such that the side cover rotates with respect to the rotation axis of the first case.

2. The case assembly of claim 1,
wherein an angle between the first position and the second position is from 87 degrees to 93 degrees.

3. The case assembly of claim 1,
wherein the side cover has a curve having a round shape at one corner that contacts the second case.

4. The case assembly of claim 3, wherein the second case has a curve having a round shape at one corner that contacts the side cover.

5. The case assembly of claim 4, wherein a R value of the curve of the side cover is larger than a R value of the curve of the second case.

6. The case assembly of claim 1,
wherein the first case has a first button part that has a groove or an opening at one side of the first case, and a second button part that has a groove or an opening at one side of the second case, and
wherein an angle between each side of the first button part and the second button part is from 150 degrees to 160 degrees when the foldable mobile electronic device is in a folded state.

7. The case assembly of claim 1, further comprising a support housing disposed in the pin hole.

8. The case assembly of claim 7, wherein the spring is disposed in the support housing.

* * * * *